United States Patent [19]
Krug

[11] 3,976,458
[45] Aug. 24, 1976

[54] REFRIGERATION MEANS
[75] Inventor: Laurence M. Krug, Tuscon, Ariz.
[73] Assignee: George C. Jeffreys, Goldsboro, N.C.
[22] Filed: Feb. 18, 1975
[21] Appl. No.: 550,866

Related U.S. Application Data
[63] Continuation-in-part of Ser. No. 396,387, Sept. 12, 1973, Pat. No. 3,866,433.

[52] U.S. Cl. ............................. 62/175; 62/236; 62/243
[51] Int. Cl.² ........................................... B60H 3/04
[58] Field of Search ............. 62/243, 323, 236, 510, 62/175, 229

[56] References Cited
UNITED STATES PATENTS
3,633,377  1/1972  Quick ................................. 62/510
3,885,398  5/1975  Dawkins ............................. 62/236

*Primary Examiner*—William E. Wayner
*Attorney, Agent, or Firm*—John H. Widdowson

[57] ABSTRACT

In an engine powered vehicle having a generator, a storage battery, and a refrigerated compartment having a refrigerated cooling coil, a compressor is connected to the cooling coil, the condensor is connected to the compressor. A refrigerant expansion means is connected to the compressor and to the cooling coil. In one embodiment a second compressor is operatively connected to the vehicle engine; in another a second condensor is connected to the second compressor, and in another the refrigeration system includes a third compressor connected in parallel with the first compressor and the second compressor. A second condensor, a second means to expand refrigerant, and a second cooling coil is connected with the third compressor to refrigerate two separate compartments. Each embodiment preferably has a control to operate the systems relative to the refrigeration demand of the system.

16 Claims, 3 Drawing Figures

REFRIGERATION MEANS

CROSS REFERENCE TO RELATED APPLICATION

This application is a continuation-in-part application based on my pending patent application entitled AUXILIARY REFRIGERATION POWER MEANS, Ser. No. 396,387, filed Sep. 12, 1973 and to be issued as Pat. No. 3,866,433 Feb. 18, 1975.

BACKGROUND OF THE INVENTION

This invention is related to refrigeration systems which can be powered from either two alternately available sources. More particularly this invention is related to refrigeration systems for engine powered vehicles and the like where the engine power is used to operate the refrigeration system in one mode of operation and a source of alternating current electrical power is used to operate the refrigeration system in a second mode of operation.

Prior to my auxiliary refrigeration power means described in the aforementioned related material there was no known way to operate a refrigeration system from two alternately usable power sources other than connecting a single compressor with the two power sources and using belts, clutches, and other mechanical apparatus to couple the power source with the single compressor. My prior invention provided a refrigeration system which is operable by either an alternating current power source through an alternating current motor and a compressor or through a second compressor which is connected with a direct current electrical motor. This device uses a rectifier in switching circuits to connect either the alternating current electric motor or the direct current electric motor to provide power for the refrigeration system either from a commonly available source of alternating current or from the battery of an engine powered vehicle. This apparatus requires specially produced direct current electric motors capable of reliably operating a compressor. Several devices are known in the refrigeration art for operating refrigeration systems from the engine of a motor vehicle by means of a compressor connected with the crank shaft of the vehicle's engine. However, these prior art devices are limited to extremely simple refrigeration systems having only the basic and necessary operating elements and they are specifically constructed for use in airconditioning automobiles, trucks, and the like wherein the temperature range of the refrigerated compartment which is the interior of the automobile is not particularly critical. There are no devices known in the prior art which will operate a refrigeration apparatus in a vehicle from either an alternating current power source or from the vehicle's engine and maintain a refrigerated compartment in the vehicle within a predetermined and certain temperature range without using separate refrigeration systems or the above-noted mechanical devices. Furthermore, no refrigeration systems are known in the art which will refrigerate multiple compartments of a vehicle at different temperature ranges and be powerable from either an alternating current power source or a single compressor on the vehicle's engine.

SUMMARY OF THE INVENTION

The apparatus of this invention is presented in several embodiments. The several embodiments function similarly in that they can be powered from an alternating current power source or from the engine of a vehicle. In an embodiment, (1), of the refrigeration means of this invention it includes a compressor powerable from an alternating current power source connected with a condensor, a refrigerant expansion devide, such as an expansion valve, and an evaporator or cooling coil connected in a loop with a second engine powered compressor connected in parallel with the compressor and being operable from the engine of a vehicle. In another embodiment, (2), the refrigeration means of this invention includes a compressor powerable from an alternating current electrical power source connected with a condensor, connected to an expansion device such as an expansion valve, and an evaporator or cooling coil connected in a loop, and further including a second engine powered compressor and a second condensor connected in parallel with the first compressor and the first named condensor to alternately operate the refrigeration system from a vehicle engine. In another embodiment, (3), of the refrigeration means of this invention, it includes three compressors connected in a parallel relation with one compressor being connected with a first condensor, a first expansion device such as an expansion valve, and a first evaporator cooling coil in a loop. A second compressor is powered from a vehicle engine. The thirs compressor is connected with a second condensor, a second expansion device such as an expansion valve, and a second evaporator or cooling coil in a loop. This embodiment, (3), is designed to refrigerate separate compartments of a vehicle and maintain the refrigerated compartments in separate refrigerated conditions, if necessary or if desired.

One object of this invention is to provide a refrigeration apparatus overcoming the aforementioned disadvantages of the prior art devices.

Still, one object of this invention is to provide a refrigeration system for the refrigerated compartment of a vehicle wherein the refrigeration system can be powered from a source of alternating current electrical power via one motor and compressor or alternately it can be powered froma compressor operatively connected with the vehicle's engine.

Yet, another object of this invention is to provide a refrigeration apparatus for a powered vehicle having a vapor compression refrigration circuit with a pair of compressors connected in parallel in a single looped refrigeration circuit wherein one compressor is powerable from an alternating circuit electrical power source and the other is powerable from a vehicle power source whether it is an engine, a motor, or any other rotary powering device.

Yet, another object of this invention is to provide a vapor compression refrigeration circuit and apparatus for refrigerating separate compartments of an engine powered vehicle wherein each compartment hahs a separate evaporator or cooling coil in each loop of the circuit and wherein the system smploys a pair of compressors, one for each loop with the compressors being connected in parallel and connected with another compressor that is powered from the vehicle engine.

Various other objects, advantages, and features of this invention will become apparent to those skilled in the art from the following discussion, taken in conjunction with the accompanying drawings, in which:

Figure 1:
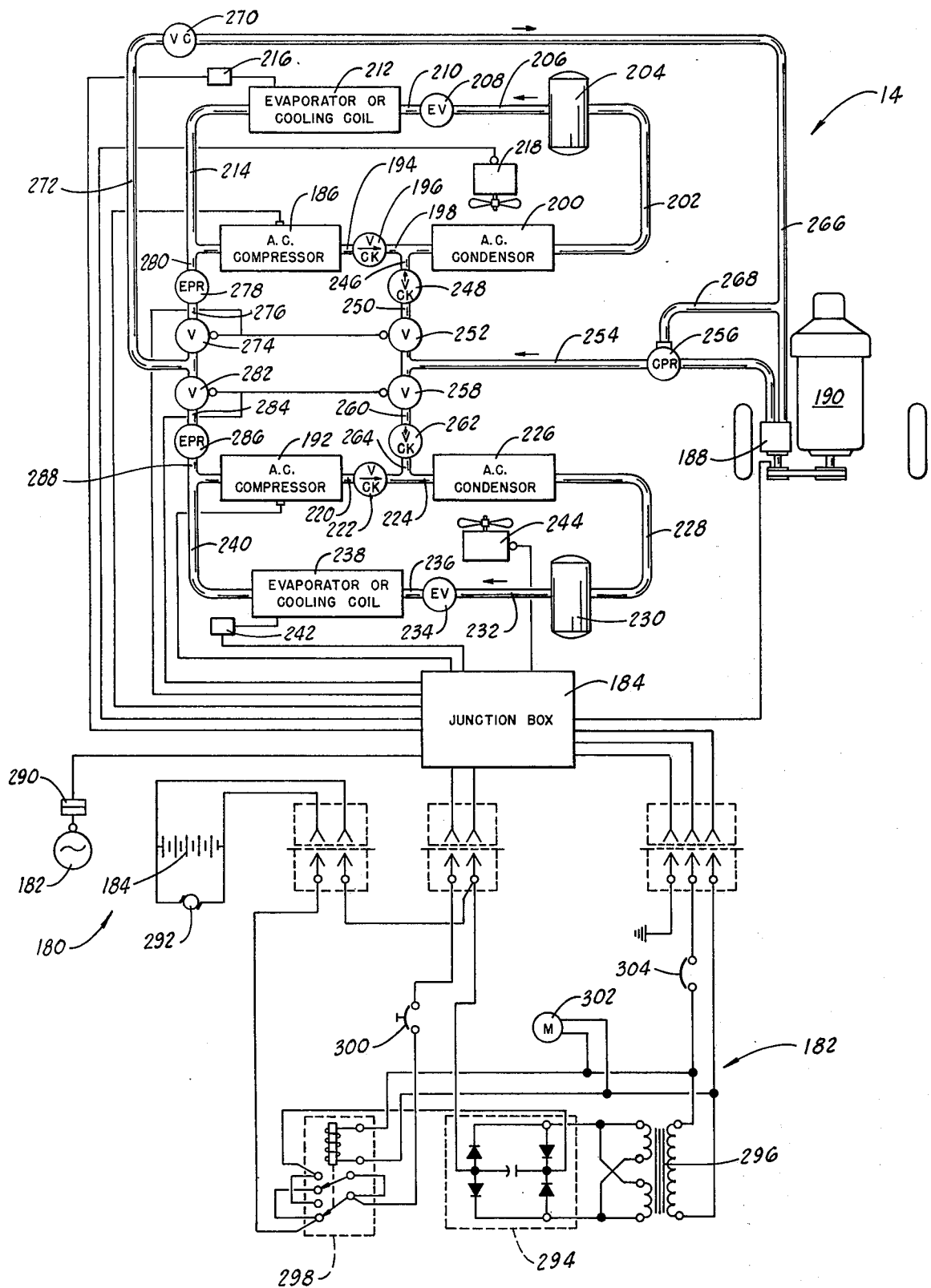
FIG. 1 is a schematic diagram of the third embodiment, (3), of the vapor refrigeration system of this invention showing the refrigeration circuit and the electrical control apparatus therefore in a diagramatic form.

The following is a discussion and description of preferred specific embodiments of the refrigeration means of this invention, such being made with reference to the drawings, whereupon the same reference numerals are used to indicate the same or similar parts and/or structure. It is to be understood that such discussion and description is not to unduly limit the scope of the invention.

DESCRIPTION OF PREFERRED EMBODIMENTS

Figure 2:
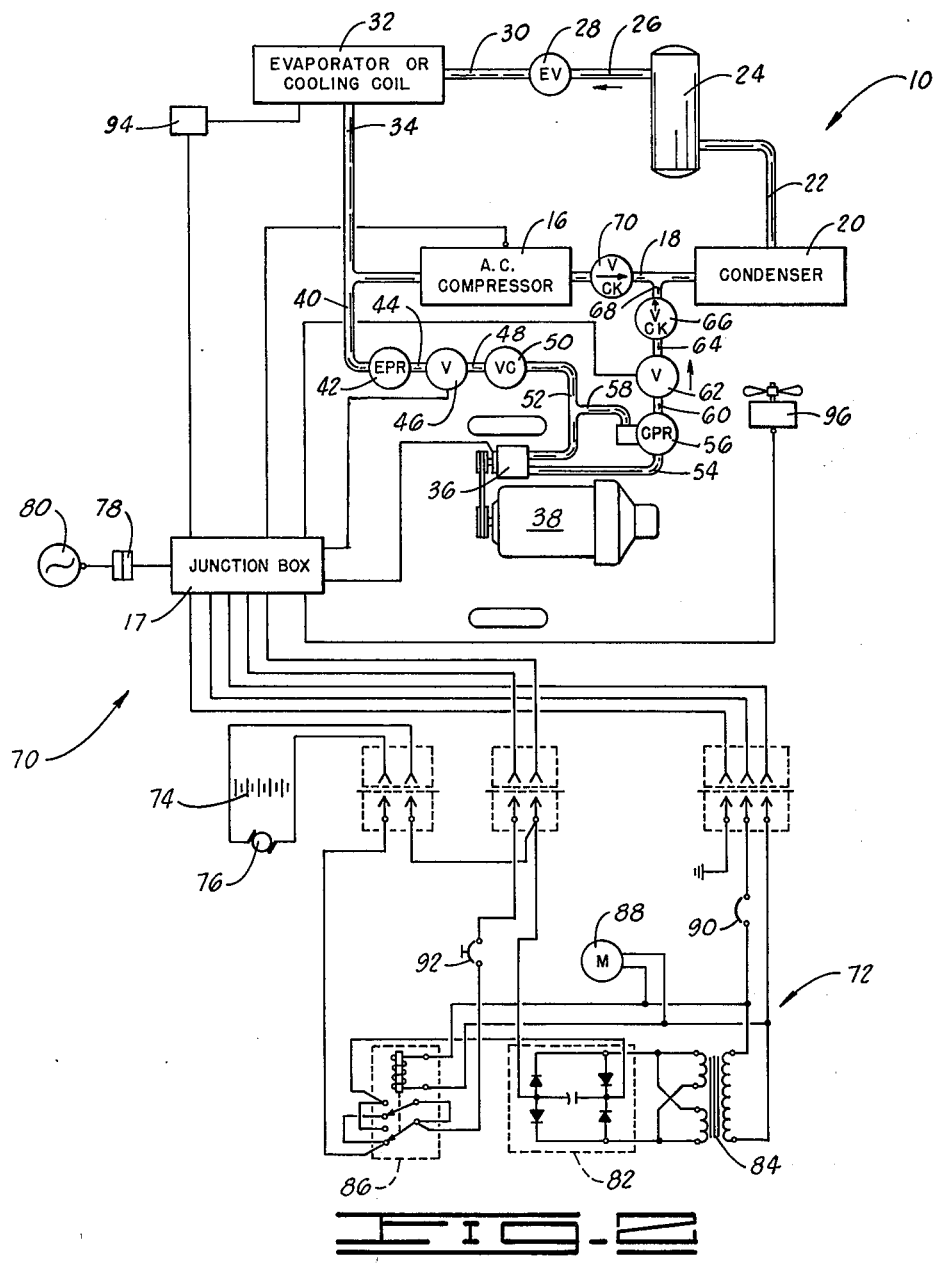
FIG. 2 is a schematic view of the first embodiment, (1), of the vapor compression refrigeration apparatus of this invention showing the refrigeration circuit and the electrical control apparatus therefor in diagramatic form.
Figure 3:
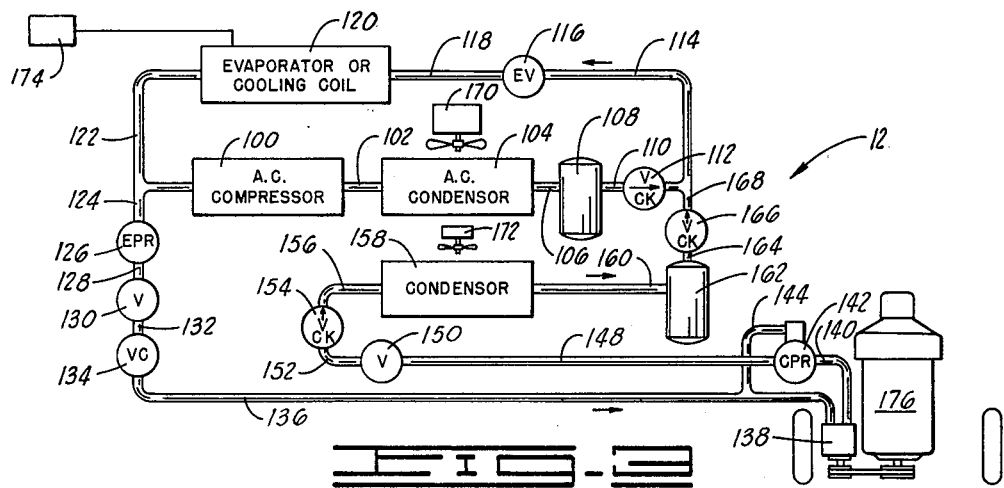
FIG. 3 is a schematic diagram of the third embodiment, (3), of the vapor compression refrigeration system of this invention showing only the refrigerant circuit portion of the apparatus in diagram form.

Referring to the drawings generally, FIG. 2 illustrates an embodiment, (1), of the invention, indicated generally at 10, wherein the refrigeration circuit is shown along with the electrical circuit portion of the apparatus. FIG. 3 shows another embodiment, (2), of the refrigeration apparatus, indicated generally at 12, wherein only the refrigeration circuit is shown. And FIG. 1 shows another embodiment, (3), of this invention, indicated generally at 14, wherein the refrigeration circuit is shown along with the electrical control circuit.

Referring to FIG. 2 in detail the refrigeration circuit of this first embodiment, (1), includes a compressor 16 connected by conduit 18 to a condensor 20 which is connected by conduit 22 to a refrigerant storage vessel 24 which is connected by conduit 26 to a refrigerant expansion device 28 such as an expansion valve, which is connected by conduit 30 to an evaporator or cooling coil 32 which is connected by conduit 34 to the compressor 16. The refrigerant expansion device 28 can be an expansion valve, a capillary tube or any other device which will adiabaticly expand the refrigerant in a suitable manner. The compressor 16 is operably connected to an alternating current type electric motor. A second compressor 36 is communicably connected in parallel with the first compressor 16. The second compressor 36 is operably connected to the vehicle's engine 38. The cooperative connection between the first compressor 16 and the second compressor 36 is as follows: The conduit 34 from the evaporator or cooling coil 32 to the compressor 16 is connected to another conduit 40, an evaporator pressure regulator 42 is connected in the conduit 40 and connected by conduit 44 to a first solenoid actuated valve 46 which is connected by conduit 48 to an excess vacuum control 50 which is in turn connected by conduit 52 through the inlet of the second compressor 36. The outlet of the compressor 36 is connected by conduit 54 to a crankcase pressure regulator 56. The crankcase pressure regulator 56 is communicably connected by conduit 58 to the conduit 52 leading into the inlet of compressor 36. Conduit 60 from the crankcase pressure regulator 56 connected a second solenoid actuating valve 62 which is connected by conduit 64 to a second check valve 66 which is in turn connected by conduit 68 to the conduit 18 between the first compressor 16 and the condensor 20. A first check valve 70 is interposed in the conduit 18 between the compressor 16 and the juncture of conduits 18 and 68. Check valves 66 and 70 are arranged to permit fluid to flow into the condensor from the first compressor 16 or the second compressor 36. The evaporator pressure regulator 42 is a standard commercially available item and designed to regulate the outlet pressure from an evaporator or cooling coil. In this case the evaporator pressure regularor 42 regulates the pressure in the return lines leading into the second compressor 36. This is necessary to prevent the compressor 36 from reducing the pressure in the evaporator to a pressure that is below what is feasible for a certain operation. The evaporator pressure regulator is an adjustable device which will allow the pressure leaving the evaporator to be regulated by the user as desired. The solenoid actuated valves 46 and 62 are provided for disconnecting the second compressor 36 from the refrigeration circuit when the first compressor 16 is in operation. The solenoid actuated valves 46 and 62 are electrically connected to the junction box 17. The excess vacuum control valve 50 is provided to temporarily stop fluid flow to the second compressor 36 during periods of high speed operation of the second compressor 36 to prevent it from substantially completely evacuating the evaporator or cooling coil and causing air to be drawn into the system because of the extremely reduced pressure. The excess vacuum control valve 50 is an adjustable pressure sensative valve operable here to close fluid flow in the line when pressure in the line drops to a predetermined and certain value. The crankcase pressure regulator 56 is provided to regulate the output pressure from the second compressor 36. The crankcase pressure regulator 56 is connected between the output and the intake connections of the second compressor 36 as illustrated. It opens when pressure from the output of the compressor 36 reaches a predetermined and certain value and discharges fluid into the intake of the compressor through conduit 58 to prevent the output pressure as would be seen by the condensor 20 from becoming excessive.

A control means for the refrigeration apparatus 10 is indicated generally at 70 and includes a power supply 72, a junction box 17 and vehicle battery 74 and the vehicle generator or alternator 76. The junction box 17 is electrically connectable by means of a plug and a socket 78 to a source of alternating current electrical power 80, it contains numerous wiring junctions and relays to operate the solenoid actuated devices and electrical components of the refrigeration apparatus 10 in conjunction with the power supply 72, the vehicle battery 74 and the alternating current source 80. The vehicle battery 74 is preferably a twelve volt type because it is common for most automotive vehicles. The power supply 72 has a rectifier including diode bridge 82 and a transformer 84 to convert the alternating current into direct current at twelve volts. Preferably the power supply 72 is constructed to be used with a 115 volt alternating current electrical power source. A relay 86 in the power supply 72 is electrically connected to automatically perform switching operations to switch electrical operation of the refrigeration system from the alternating current power source to the direct current source of the vehicle battery 74 and vice versa when the alternating current power source is connected of disconnected. The power supply has a fan with a cooling motor 88 provided to cool the power supply when in operation. A fuse 90 is provided to prevent damage due to overloading. A master switch 92 is included to provide for overriding the system and disconnecting or turning off either of the compressors and the electrical apparatus manually.

A thermostatic switch 94 has a temperature sensitive probe located at the evaporator or cooling coil 32 and it is electrically connected to the control means 70 through the junction box 17. A cooling fan 96 is provided to cool the condensor 20. The motor of the cooling fan 96 is electrically connected to the junction box 72. In the event the condensor 20 is a free flow type condensor the cooling fan 96 might not be necessary depending upon the particular installation of the condensor. In the event the condensor 20 is a radiant shell type condensor the cooling fan 96 would not be needed.

In the use and operation of the refrigeration apparatus 10 the control means 70 functions to control operation of the apparatus and switching it from operating via the alternating current electrical power to operating from the power of the vehicle engine 38. When the plug and socket 78 is connected to the alternating current power source 80 then switching circuits in the junction box 17 and the power supply 72 connect the motor of the first compressor 16 for operation and at this time the refrigerant flows through the loop of the circuit in the upper portion of FIG. 2. The thermostatic switch 94 controls operation of the compressor 16 in relation to the refrigeration demand of the system and it also controls operation of the condensor fan 96 when it is present. When the alternating current power source 80 is not connected the control means 70 functions to operate the refrigeration system from the vehicle engine 38 and the vehicle battery 74. When this change is made the solenoid actuated valves 46 and 62 are opened to allow the refrigerant to pass through the second compresor 36. The thermostatic switch 94 controls operation of the clutch on the second compressor 36 to connect and disconnect it from the rotation by the vehicle engine 38. When in operation in this mode the second check valve 66 allows the refrigerant to pass into the conduit 18 and condensor 20. The first check valve 70 prevents the refrigerant from being forced into the outlet of the first compressor 16. The evaporator pressure regulator 42, the excess vacuum control valve 50 and the crankcase pressure regulator 56 function as described above to control the operating pressures in the fluid circuit of the refrigeration system. When it is desired to change the mode of operation of the refrigeration system to power it from the alternating current power source the plug and sockets 78 are reconnected. This automatically disconnects the battery 74 by the switching circuits in the junction box 17 and the power supply 72 so the system will operate from the alternating current power source 80.

Another embodiment, (2), of the refrigeration means of this invention is shown in FIG. 3 and indicated generally at 12. The refrigeration system 12 as shown in FIG. 3 can be controlled by the same control means as that illustrated in FIG. 2. For reasons of convenience and to avoid repetition the control means is not included in FIG. 3. The refrigeration system 12 includes a first compressor 100 connected by conduit 102 to a first condensor 104 which is connected by conduit 106 to a refrigerant storage vessel 108 which is in turn connected by conduit 110 to a first check valve 112, which is in turn connected by conduit 114 to a refrigerant expansion device 116, which is connected by conduit 118 to the evaporator or cooling coil 120, which is in turn connected by conduit 122 through the inlet of the first compressor 100. The first compressor 100 is labeled as an A.C. compressor because it is powered by an alternating current type electrical motor. The connection between the first compressor 100 and the engine driven compressor is as follows: A conduit 124 is connected with conduit 122 joined the inlet of the first compressor 100, an evaporator pressure regulator 126 is connected to the conduit 124 and connected by conduit 128 to a first solenoid actuated valve 130 which is in turn connected by a conduit 132 to an excess vacuum control valve 134, which is connected by conduit 136 to the second compresosr 138. The second compressor 138 at its outlet has a conduit 140 connecting it to a crankcase pressure regulator 142. The crankcase pressure regulator is connected by conduit 144 to conduit 136 and it is connected by conduit 148 to a second solenoid actuated valve 150, which is connected by conduit 152 to a third check valve 154, which is connected by conduit 156 to a second condensor 158, which is connected by conduit 160 to a refrigerant storage vessel 162, which is connected by conduit 164 to a second check valve 166, which is connected by conduit 168 to conduit 114. The condensors 104 and 158 can be either free flow type condensors or radiant shell type condensors. In the instance where the condensors 104 and 158 are of the free flow type it is necessary for cooling air to be circulated past the fans thereof and for this reason cooling fans 170 and 172 are shown with the respective condensors. In the instance where the condensors are of the radiant shell type then cooling fans are not used thus fans 170 and 172 are not included.

A thermostatic switch 174 has its temperature sensitive element adjacent to the evaporator or cooling coil 120 to sense the temperature for use in controlling the on and off operation of the refrigeration system 12. The evaporator pressure regulator 126, the solenoid valves 130 and 150, the excess vacuum control valve 134, and the crankcase pressure regulator 142 function as described above in conjunction with the first described embodiment, (1), of this invention. The refrigerant expansion device 116 can be a conventional expansion valve or a capillary tube or any other suitable device to substantially adiabaticly expand a refrigerant depending upon the desire of the user. The second compressor 138 has a clutch which is used to connect and disconnect it from the rotation of the vehicle's engine 176. Preferably, the vehicle engine 176 is connected to the second compressor 138 by pulleys and belts, however, it can be connected ay any suitable means. The refrigerant storage vessels 108 and 162 are optional items and may or may not be necessary depending upon whether an expansion valve or a capillary tube is used as a refrigerant expansion device 116 and whether radiant shell or free flow condensors are used. The first check valve 112 prevents refrigerant from being forced in reverse flow into the condensor 104 and compressor 100 when the engine driven compressor or the second compressor 138 is in operation. Likewise the second check valve 166 prevents refrigerant from being forced into the second condensor 158 and the second condensor 130 when the first compressor 100 is in operation.

Although the control means for the second embodiment, (2), of the refrigeration means of this invention is not shown it can be operated by the control means similar to that shown in FIG. 2 because the solenoid actuated valves, the thermostatic switch, and the cooling fan are essentially the same and can be operated and controlled in similar manner.

In the use and operation of the refrigeration system as shown in FIG. 3 the first compressor 100 or the second compressor 138 are operated alternately to provide the compression portion of the refrigeration cycle. When the first compressor 100 is operating the solenoid actuated valves 130 and 150 are closed thereby eliminating the second compressor 138 from the circuit and the refrigerant flows in the loop of the circuit shown in the upper portion of FIG. 3. At this time the thermostatic switch 74 controls the on and off operation of the motor which is connected with the first compressor 100 as well as controlling the coondensor fan 170 when a condensor fan is used. At this time the first check valve 112 is open and the second check valve 166 is closed due to the motion of the fluid in the refrigeration circuit. When the refrigeration system is operating from the vehicle power the solenoid actuated valves 130 and 150 are open and the refrigerant closed through the outer loop of the circuit as shown in FIG. 3. Because the engine 176 is used to turn the second compressor 138 the thermostatic switch 174 controls operation of the clutch for the compressor 138 as well as controlling the condensor fan 172. Additionally in the use of the refrigeration system as shown in FIG. 3 the second condensor 158 can be mounted on the exterior of a vehicle such as on the roof or in front of the radiator for the engine while the first condenser 104 can be constructed as a portion of a refrigerated compartment or mounted on the vehicle in some convenient position.

Another embodiment, (3) of the refrigeration means of this invention is shown in FIG. 1 and indicated generally at 14. The control means for the refrigeration system 14 is indicated generally at 180 and includes a power supply, indicated generally at 182 and a junction box 184. Alternating current electrical power is provided from a source indicated at 182 and direct current electric power is provided from the vehicle's battery 184. The refrigeration circuit includes a first compressor 186 driven from an alternating current type electrical motor, a second compressor 188 driven from the vehicle's engine 190, and a third compressor 192 driven from another alternating current type electrical motor with the three compressors connected in a parallel relation. The first compressor 186 and the third compressor 192 are connected to operate separate loops in the refrigeration circuit and the second compressor 188 is connected to operate both of the loops replacing the first compressor 186 and the third compressor 192 when it is in operation.

The loop of the refrigeration circuit 118 which includes the first compressor 186 has the outlet of the first compressor 186 connected by conduit 194 to a first check valve 196 which is connected by conduit 198 to a first condensor 200, which is connected by conduit 202 to a refrigerant storage vessel 204, which is connected by conduit 206 to a refrigerant expansion device 208, such as an expansion valve, which is connected by conduit 210 to a first evaporator or cooling coil 212, which is in turn connected by conduit 214 to the inlet of the first compressor 186. A first thermostatic switch 216 has its temperature sensing element located at the first evaporator or cooling coil 212. The first condensor 200 can be a free flow type or a radiant shell at the desire of the user. In the event the condensor 200 is a free flow type a cooling fan will be necessary. A cooling fan for the first condensor is indicated at 218. It is to be understood that this fan is optional depending upon the particular condensor used.

The loop of the refrigeration circuit which includes the third compressor 192 has a conduit 220 from the outlet of the compressor to a third check valve 222 which is connected by conduit 224 to a second condensor 226, which is connected by conduit 228 to a refrigerant storage vessel 230, which is connected by conduit 232 to a refrigerant expansion device 234 such as an expansion valve, which is connected by conduit 236 to a second evaporator or cooling coil 238, which is connected by conduit 240 to the inlet of the third compressor 192. A second thermostatic switch 242 has its temperature sensing element at the evaporator or cooling coil 238. The second condensor 226 can be a radiant shell type or a free flow type depending upon the desire of the user. In the event the second condensor 226 is the free flow type a cooling fan may be necessary and one is indicated at 244. It is to be understood that the cooling fan 224 is optional depending upon the type of the condensor used.

The second compressor 188 is connected in parallel with the first compressor 186 and the second compressor 192 and for convenience it is shown placed on the right hand said portion of FIG. 1. In the loop of the circuit containing the first compressor 186, the conduit 198 between the first check valve 196 and the first condensor 200 is connected with conduit 246 joining a second check valve 248, which is connected by conduit 250 to a first solenoid actuated valve 252, which is connected by conduit 154 to the crankcase pressure regulator 256, which is connected to the outlet of the second compressor 188. The circuit which joins the second compressor 188 and the loop of the circuit containing the third compressor 192 contains a second solenoid actuated valve 258 which is connected with conduit 154 at a Tee connection as illustrated. The second solenoid actuated valve 158 is connected by conduit 260 to a fourth check valve 262, which is connected by conduit 264 to conduit 224 which joins the third check valve 222 and the second condensor 226. The check valves 248 and 262 allow the refrigerant to pass from the second compressor 188 into the condensors 200 and 226 and prevent refrigerant flow in the opposite direction. In the low pressure side of the circuit the second compressor 188 has its inlet connected with conduit 266. The crankcase pressure regulator 256 is connected by conduit 268 to the inlet conduit 266. An excess vacuum control valve 270 is placed in conduit 266 and it is connected by conduit 272 to a Tee connection, which has one side connected to a third solenoid actuated valve 274, which is connected by conduit 276 to a first evaporator pressure regulator 278, which is connected by conduit 280 to conduit 214 and the inlet of the first compressor 186. The Tee connection at conduit 272 has its other opening connected with a fourth solenoid actuated valve 282, which is connected by conduit 284 with a second evaporator pressure reguulator 286, which is connected by conduit 288 with conduit 240 and the inlet of the third compressor 192. The solenoid actuated valves 252, 258, 274, and 282 are electrically connected to the junction box and are in use operated simultaneously for connecting and disconnecting the second compressor 188 in the refrigeration circuit. These solenoid actuated valves are closed when the second compressor 188 is not functional and the system is operating on alternating current electrical power. These valves are opened when the second compressor 188 is operational. The evaporator pressure regulators, the excess vacuum control valve, and the crankcase pressure regulator function as described above in conjunction with the other embodiments and as is well known in the art. The refrigerant expansion devices 208 and 234 can be conventional expansion valves or a capillary tube depending upon the desire of the user or any other device which will function to substantially adiabaticly expand the compressed refrigerant in a suitable manner. Check valves 248 and 262 permit fluid flow from the second compressor 188 when it is operational. At the time when the second compressor is operational the first check valve 196 and the third check valve 222 prevent refrigerant from being forced into the outlet of the first compressor 186 and the third compressor 192. At the time the second compressor 188 is not operational the second check valve 248 and the fourth check valve 262 prevent refrigerant from returning to the inlet of the second compressor 188 when the first compressor 186 and the third compressor 192 are not operating, and when the first compressor 186 and the third compressor 192 are operating these check valves prevent refrigerant from being forced into the outlet of the second compressor 188. The junction box 184 is electrically connected to the motors of the first and third compressors, the clutch of the second compressor, the thermostatic switches 216 and 242, the solenoid actuated valves 252, 258, 276, and 282, and to the cooling fans 218 and 244 when present. Additionally, the junction box is removably connectable to the power supply 182 and it has a plug and socket 290. The plug and socket 290 are used for removably connecting the electrical circuit of the refrigeration system 14 to the alternating current electrical power source 182. The vehicle's battery 184 is charged from the vehicle's generator or alternator 292 and the battery is removably connectable with the power supply 182. The power supply 182 is removable connectable with the junction box 184 and includes an AC to DC converter which has a diode bridge 294 and transformer 296. The power supply 182 also has a relay 298 to function in conjunction with other relays at the junction box 184 to coordinate switching of electrical power from the alternating current source to the direct current source. A master switch 300 is connected to the relay 298 to provide a manual override of the electrical system to disconnect it manually. The power supply has a cooling fan with the motor indicated at 302 connected to the relay so it will operate to cool the power supply when it is in operation. A fuse 304 is provide in the output of the power supply 182 for safety. The junction box 184 is provided to simplify the wiring necessary for the refrigeration system 14, it contains switching circuits that are needed to change between the power supply and the alternating current power source and terminals for connecting the individual electrical components of the system.

In the use and operation of the refrigertion system 14 of this embodiment, (3), of this invention it is constructed so it can be used to refrigerate separate compartments or separate units in a vehicle. For instance, it has been in refrigerating a milk truck wherein one compartment is maintained in a refrigerated condition above freezing for milk storage and a separate compartment is maintained substantially below freezing for storage of frozen products. Additionally, this system has been used with trucks for the street scales of ice cream wherein one loop of the circuit refrigerates a freezer and the other loop of the circuit provides refrigeration for a slush ice machine. In an additional installation this refrigeration system has been used ro refrigerate several compartments in a beer transportation truck wherein separate compartments are maintained at different refrigeratd temperatures. It is obvious to one skilled in the art that the refrigeration system of this embodiment of this invention can be used in numerous applications and can easily be expanded to include additional refrigerating loops and additional compressors powered from an alternating current power source which can be operated by the single engine driven compressor. It is to be understood that the refrigeration system as illustrated in FIG. 1 can be expanded substantially to include a plurality of loops containing alternating current powered compressors in parallel with the engine driven compressor to provide for the refrigeration of multiple compartments.

In operation of the refrigeration system 14 the mode of operation is controlled through the control means 180 and governed by whether or not the vehicle engine 190 is operating and whether or not the system is connected to the alternating current power source 182. When the vehicle engine 190 is inoperative the system is usually connected to the alternating current power source. This is the normal situation when the vehicle or truck is parked during the night for storage or for loading. In this instance the power supply is automatically connected as the plug and socket is connected to the alternating current power source. At this time direct current low voltage, preferably 12 volts, is provided by the power supply 182 for operation of the thermostatic switches, the relays in the junction box, the relay 294 and the cooling fans for the condensors.

When the alternating current power source is connected to solenoid actuated valves 252, 258, 274 and 282 are closed thereby eliminating the engine driven compressor 188 and isolating the loop containing the first compressor 212 from the loop containing the second compressor 192. In this condition the first compressor 186 and second compressor 192 will operate independently in accordance with the refrigeration demand of their respective evaporators or cooling coils. In this condition the motors for the compressors are operated from the alternating current power source, the thermostatic switches control this operation from low voltage provided by the power supply 182.

When the alternating current power source is disconnected the relays in the power supply in the junction box automatically open the solenoid actuated valves so that once the engine 190 is started the engine driven compressor 188 will provide the refrigerant compression that is required for operation of the system. Once the second compressor or engine driven compressor 188 is operated the thermostatic switches 216 and 242 control the operation of the clutch on the compressor to engage it and disengage it in relation to the refrigeration demand of the system. The crankcase pressure regulator 256 functions to regulate the output pressure from the compressor as it would be seen by the condensors. The excess vacuum control valve 270 functions to close the return line to the second compressor 188 when the pressure in the line reaches a predetermined and certain value. This valve functions to even the flow through the system, prevent surges and also prevent excessively low pressures in the low pressure side of the system. The evaporator pressure regulators 208 and 234 regulate the pressure the the evaporators only when the second compressor is in operation. The evaporator pressure regulators are provided so the most desirable evaporator pressures can be maintained for all operating speed conditions of the second compressor 188. Obviously because the speed of the second compressor 188 will normally vary considerably depending upon the used conditions of the truck or other vehicle the input and output pressures from the compressor. This variation would be a problem without the control provided by the crankcase pressure regulator, the evaporator pressure regulator and the excess vacuum control valve. These control devices provide for smooth operation of the refrigeration system without overloading or undly stressing any of its elements.

In the manufacture of the refrigeration means of this invention it is obvious that it can be constructed by using commonly available and conventional elements and combining them in the new and novel combination as described an shown herein. The junction box and the power supply which form the control means to operate the refrigeration apparatus have been designed to be easily connected with the several operating elements of the apparatus to that a person with nominal skills in the refrigeration art can assemble the refrigeration apparatus. In practice the refrigeration apparatus of this invention has been constructed and used with ice cream vending trucks, milk trucks and other vehicles as described. It is obvious to one skilled in the art that the refrigeration apparatus of this invention can be adapted for numerous applications on vehicles such as the trucks as described, automobiles and other vehicles which have an engine to power the second compressor or some other rotary power means to power the second compressor.

In the use and operation of the refrigeration means of this invention it is seen that same provides a unique apparatus for refrigerating a single compartment on a vehicle wherein the apparatus can be powered from an alternating current power source or from the engine which propels the vehicle. The invention also provides a refrigeration apparatus which can be used with an engine propelled vehicle and refrigerate separate compartments in the vehicle at different refrigerated conditions. This apparatus is novel in that it fulfills long felt need in the art for providing a refrigeration apparatus which can be operated from a self propelled vehicle's engine and alternately operable from a commonly available source of electrical power without complicated mechanical devices or auxiliary refrigeration systems. The refrigeration apparatus of this invention is quite unique in that it is constructed to provide two separate refrigerated compartments which are operable from a single compressor that is driven from the engine of a self propelled vehicle.

As will become apparent from the foregoing description of the applicant's apparatus, relatively simple means have been provided for the operation of a vapor compression refrigeration system wherein it can be powered from two alternately available sources, alternating current electrical power or the engine of a self propelled vehicle. The refrigeration apparatus is economical in that it has a minimum number of elements and utilizes standard commercially available parts for the most part. The apparatus is substantially automatic when installed and is provided with appropriate switching circuits to adjust the operation thereof depending upon the available power source. The refrigeration system which includes the three compressor is very versatile in that it can be used for refrigerating a compartment type vehicle wherein different refrigerating conditions must be maintained.

While the invention has been described in conjunction with preferred specific embodiments thereof, it will be understood that this description is intended to illustrate and not to limit the scope of the invention, which is defined by the following claims:

I claim:

1. In an engine powered vehicle having a storage battery and a geneerator connected to said engine and battery and a refrigerated compartment and a refrigeration system therefor including a cooling coil, a compressor connected by a conduit to the outlet of said cooling coil, an alternating current motor operatively connected to said compressor, a condensor connected by conduit to the outlet of said compressor and to the inlet of said cooling coil, and an expansion valve to adiabatically expand a refrigerant in the conduit to said cooling coil, the improvement comprising:

a. a second compressor mounted on said vehicle, said second compressor connected by conduit to said condensor and to said cooling coil in parallel with said first named compressor, b. means operatively connecting said second compressor to said vehicle engine to be driven by said engine when said engine is in operation, said second compressor having a clutch means to operably connect and disconnect said second compressor and said engine, c. control means operatively connected to said system to intermittently operate said second compressor relative to the refrigeration demand of said system when said engine is operating and to intermittently operate said first named compressor relative to the refrigeration demand of the system when said alternating current is connected to a source of alternating current electric power, d. said control means having a thermostat switch means communicably connected to said cooling unit, said thermostat switch being electrically connected to said alternating current electric motor to intermittenly operate same, and being electrically connected to said clutch means to intermittently engage same, e. a first check valve means communicably connected to said conduit from said outlet to said first named compressor to compress fluids from said first named compressor to said condensor, f. a second check valve means connected to the outlet of said second compressor to pass fluid from said second compressor to said condensor, g. a first solenoid actuated valve means communicably connected in said conduit between said cooling coil and said second compressor and electrically connected to said control means, h. a second solenoid actuated valve means communicably connected in said conduit between said second compressor and said condensor and electrically connected to said control means, said control means being operable to close said firt solenoid actuated valve and said second solenoid actuated valve when said alternating current motor is connected to a source of electricity; and i. said second compressor is constructed and adapted to be operable during periods when said alternating current motor is disconnected from a source of alternating current electricity and said vehicle engine operating.

2. The refrigeration means of claim 1, wherein:

a. a second condensor is interposed in said conduit between said second compressor and said expansion valve.

3. The refrigeration means of claim 2, wherein:

a. a third check valve means is communicably connected in said conduit between said second solenoid actuated valve means and said second condensor.

4. The refrigeration means of claim 1, wherein:

a. a third compressor is communicably connected by conduit and parallel to said first compressor and said second compressor.

5. The refrigeration means of claim 4, wherein:

a. a third check valve means communicably connected in said conduit between said outlet of said third compressor and said second condensor, and b. a fourth check valve mean communicably connected in said conduit between the outlet of said second compressor and said second conduit between said third check valve means and said second condensor.

6. The refrigeration means of claim 5, wherein:

a. a third solenoid actuated valve means is communicably connected in said conduit between said first compressor and said second compressor and electrically connected to said control means, and b. a fourth solenoid actuated valve means communicably connected in said conduit between said third compressor and said second compressor and electrically connected to said control mean.

7. The refrigeration means of claim 1, wherein, an evaporator pressure regulator means is communicably connected in said conduit between said first compressor and said first solenoid actuator valve means to regulate the pressure at the inlet of said second compressor.

8. The refrigeration means of claim 1, wherein, a crankcase pressure regulator is communicably connected in said conduit between said second compressor and said second solenoid actuator valve means.

9. The refrigeration means of claim 1, wherein, an excess vacuum control valve means is communicably connected in said conduit between said solenoid actuator valve means and said second compressor and electrically connected to said control means to stop fluid flow through same said conduit when vacuum therein drops below a predetermined and certain value.

10. The refrigeration means of claim 1, wherein:

a. an evaporator pressure regulator means is communicably connected in said conduit between said first compressor and said first solenoid actuator valve means to regulate the pressure at the inlet of said second compressor, b. a crankcase pressure regulator is communicably connected in said conduit between said second compressor and said second solenoid actuated valve means and communicably connected to said conduit between said first solenoid actuated valve means and said second compressor to regulate the pressure in said conduit into said condensor, and c. an excess vacuum control valve means is communicably connected in said conduit between said solenoid actuated valve means and said second compressor and electrically connected to said control means to stop fluid flow through same said conduit when vacuum therein drops below a predetermined and certain value.

11. The refrigeration means of claim 6, wherein:

a. a first evaporator pressure regulator means is communicably connected in said conduit between said first compressor and said third solenoid actuated control valve to regulate the pressure at the inlet of said second compressor when in use fluid is drawn from said first cooling coil, and b. a second evaporator pressure regulator means is communicably connected in said conduit between said third compressor and said fourth solenoid actuated valve means to regulate the pressure at the inlet of said second compressor when in use fluid is drawn from said second cooling coil.

12. The refrigeration means of claim 6, wherein, a crankcase pressure regulator means is communicably connected in the outlet conduit of said second compressor and communicably connected to the inlet conduit of said second compressor to in use regulate the inlet pressure at said condensors.

13. The refrigeration means of claim 6, wherein, an excess vacuum control valve means is communicably connected in said conduit between said second compressor and said third solenoid actuated control valve means and said fourth solenoid actuating control valve means to in use stop fluid flow through same said conduit when vacuum therein drops below a predetermined and certain value.

14. The refrigeration means of claim 6, wherein:

a. a first evaporator pressure regulator means is communicably connected in said conduit between said first compressor and said third solenoid actuated control valve to regulate the pressure at the inlet of said second compressor when in use fluid is drawn from said first cooling coil, b. a second evaporator pressure regulator means is communicably connected in said conduit between said third compressor and said fourth solenoid actuated valve means to regulate the pressure at the inlet of said second compressor when in use fluid is drawn from said second cooling coil, c. a crankcase pressure regulator means is communicably connected in the outlet conduit of said second compressor and communicably connected to the inlet conduit of said second compressor to in use regulate the inlet pressure at said condensors, and d. an excess vacuum control valve means is communicably connected in said conduit between said second compressor and said third solenoid actuated control valve means and said fourth solenoid actuated control valve means to in use stop fluid flow through same said conduit when vacuum therein drops below a predetermined and certain value.

15. The refrigeration means of claim 6, wherein, said refrigeration means has a cooling fan for cooling said first condensor, said cooling fan having a direct current electric motor and being electrically connected to said control means to in use be operated when either said first compressor or said second compressor are in operation.

16. The refrigeration means of claim 6, wherein:
a. said first cooling coil is mounted in a refrigerated compartment which in operation is maintained within a predetermined and certain temperature range, and
b. said second cooling coil is mounted in another refrigerated compartment separate from said first refrigerated compartment to in use maintain said second named refrigerated compartment within a predetermined and certain temperature range.

* * * * *